Jan. 27, 1931.  O. A. BANNER  1,790,221
POWER PLANT
Filed Aug. 6, 1920   6 Sheets-Sheet 1

INVENTOR.
Otto A. Banner
BY
Ralph W. Brown
ATTORNEY.

Jan. 27, 1931.  O. A. BANNER  1,790,221
POWER PLANT
Filed Aug. 6, 1920   6 Sheets-Sheet 2
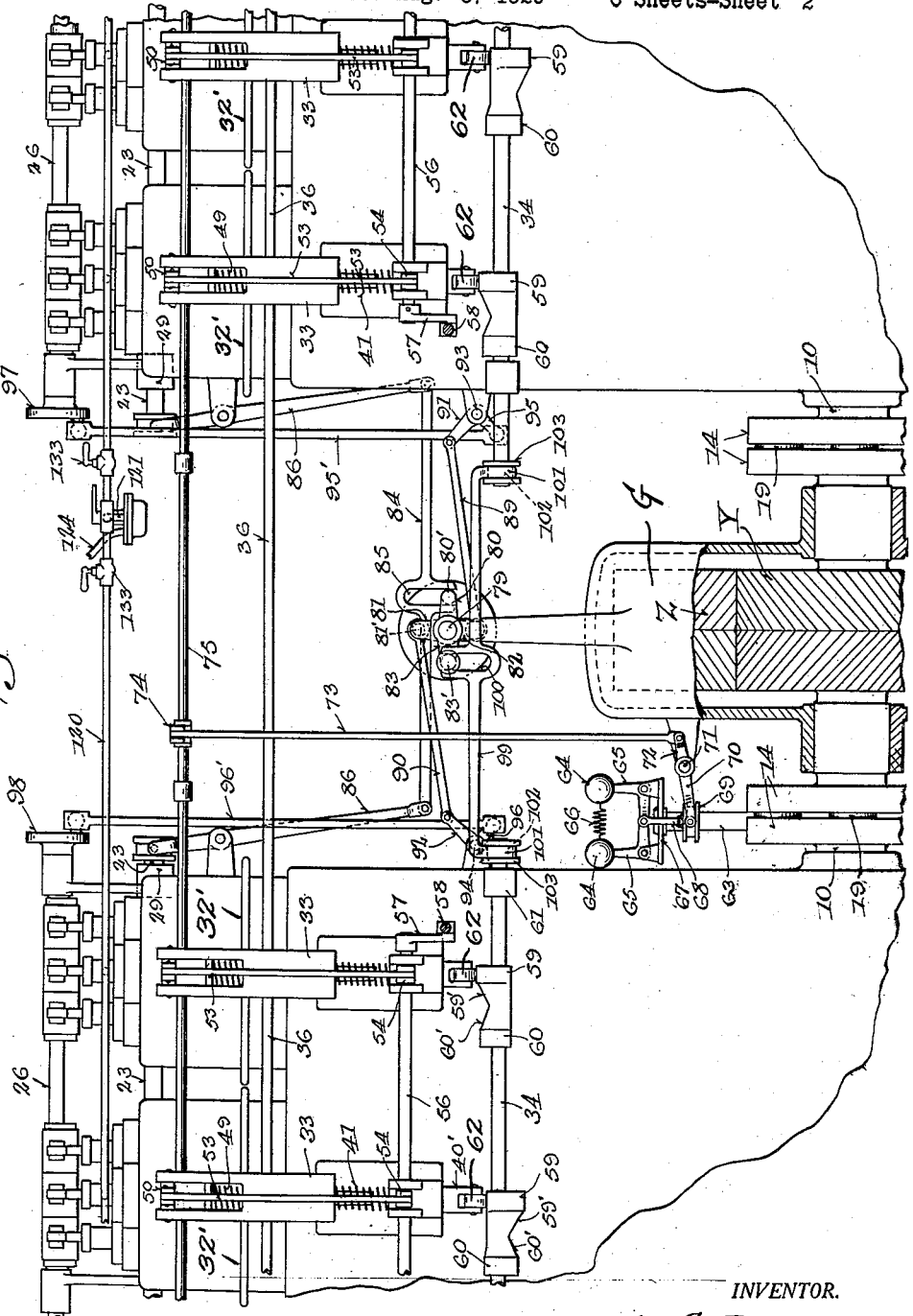
INVENTOR.
Otto A. Banner
BY
Ralph W Brown
ATTORNEY.

Jan. 27, 1931.  O. A. BANNER  1,790,221
POWER PLANT
Filed Aug. 6, 1920  6 Sheets-Sheet 3
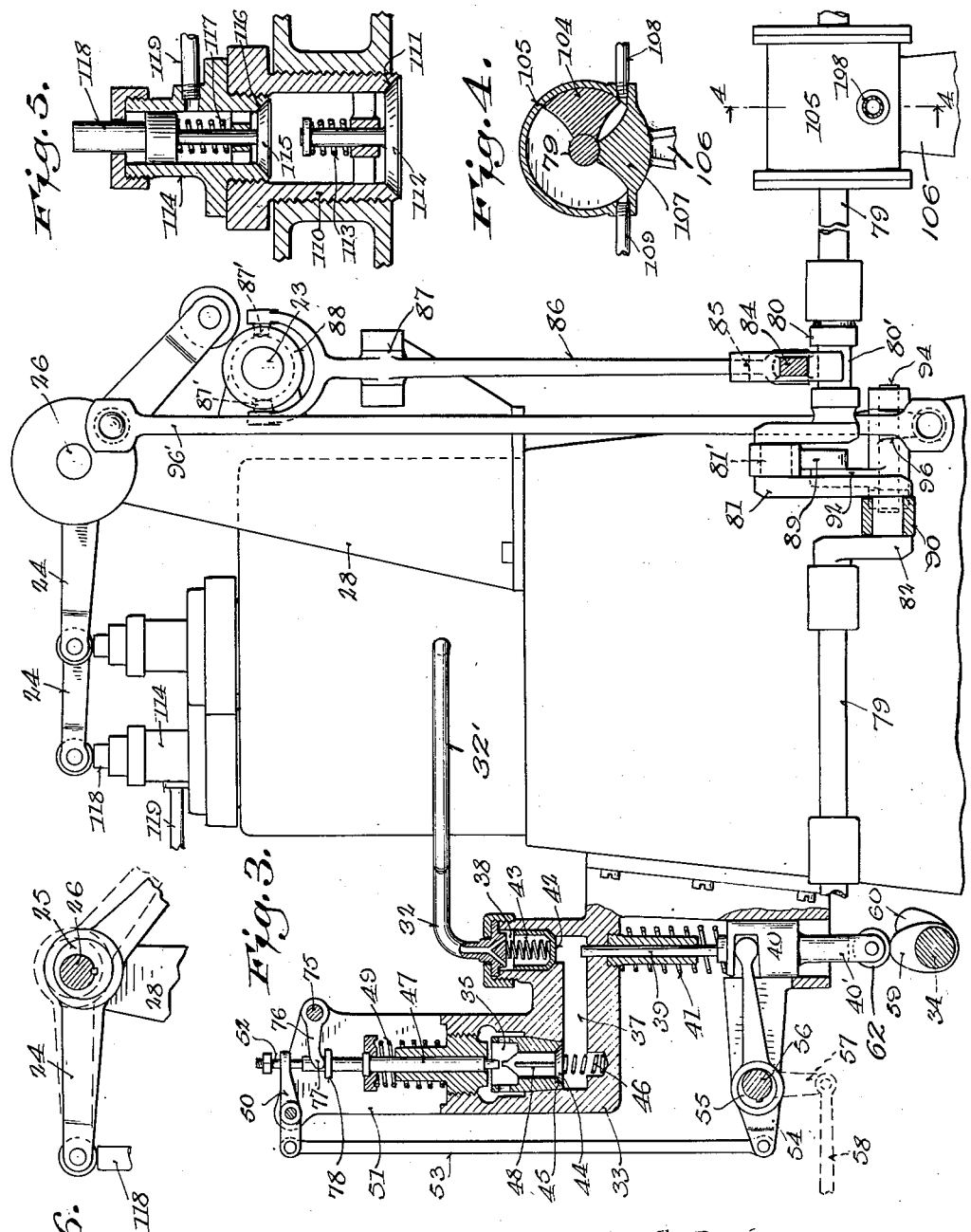
Otto A. Banner
INVENTOR.
BY
Ralph W. Brown
ATTORNEY.

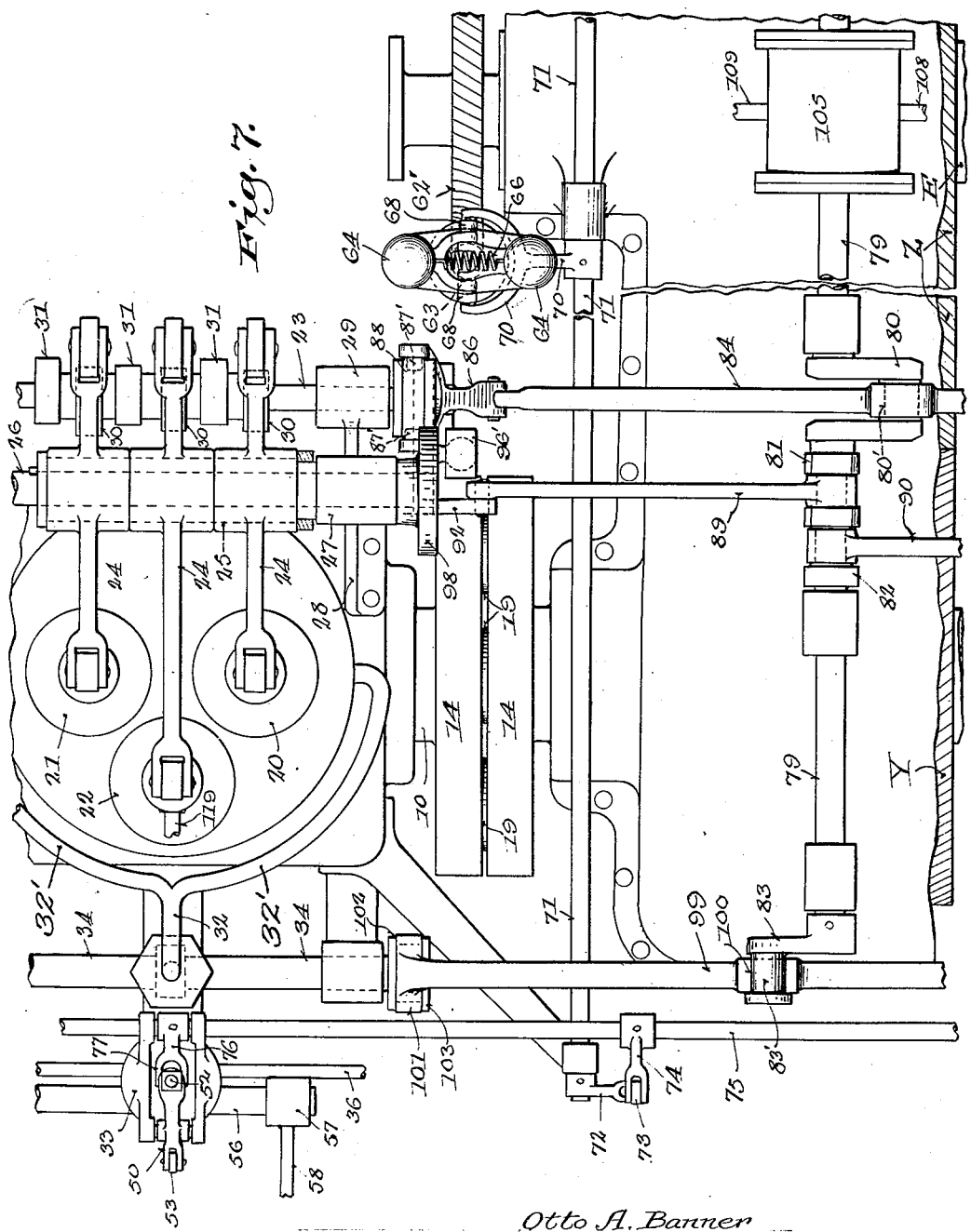

Jan. 27, 1931.   O. A. BANNER   1,790,221
POWER PLANT
Filed Aug. 6, 1920   6 Sheets-Sheet 5
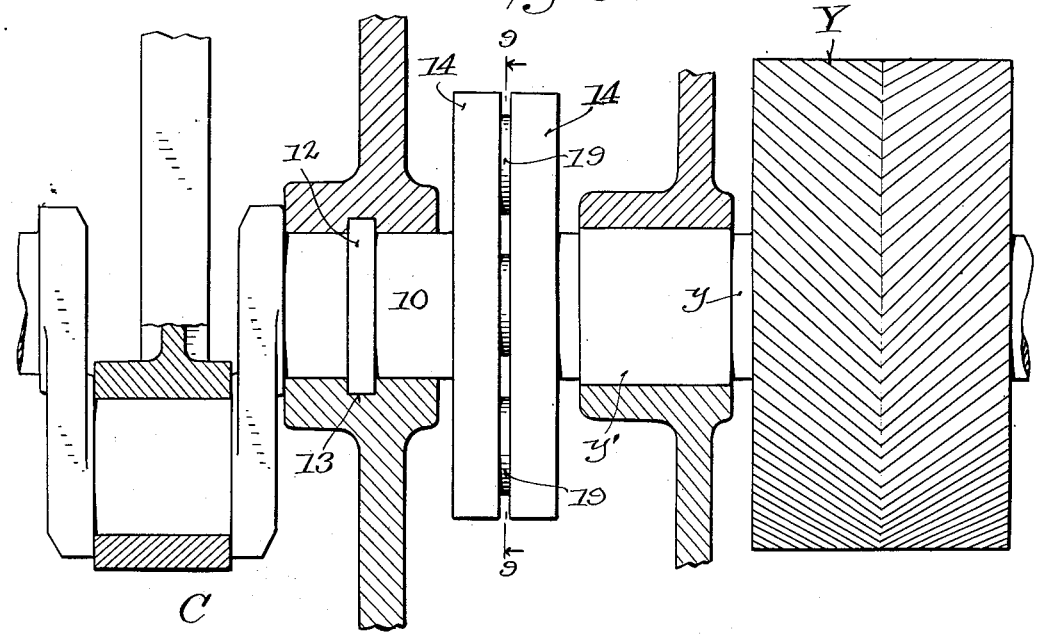
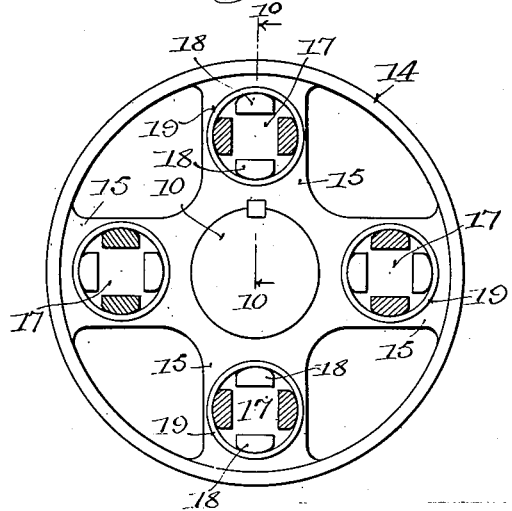
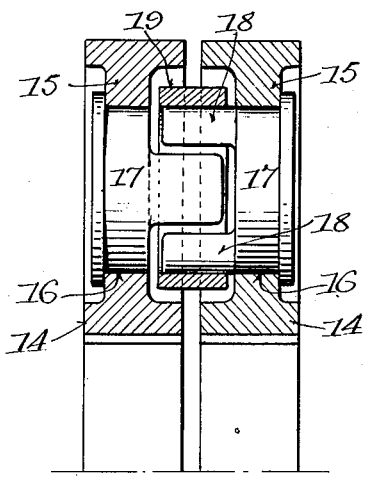
Otto A. Banner
INVENTOR.
BY
Ralph W. Brown
ATTORNEY.

Jan. 27, 1931.  O. A. BANNER  1,790,221
POWER PLANT
Filed Aug. 6, 1920   6 Sheets-Sheet 6

Otto A. Banner
INVENTOR.

BY

Ralph W Brown
ATTORNEY.

Patented Jan. 27, 1931

1,790,221

UNITED STATES PATENT OFFICE

OTTO A. BANNER, OF MILWAUKEE, WISCONSIN, ASSIGNOR TO THE FALK COMPANY, OF MILWAUKEE, WISCONSIN, A CORPORATION OF WISCONSIN

POWER PLANT

Application filed August 6, 1920. Serial No. 401,754.

This invention relates to power plants, primarily for marine use, although the invention is also well adapted for use in mills and other stationary plants where power in large quantities is required.

The internal combustion engine, and particularly the oil engine, is coming to the fore as a prime mover in marine installations. This is possible, due to the remarkable high development and consequent reliability of the oil engine of today. There is a practical limit, however, to the size and capacity of a single oil engine cylinder. Furthermore, there is a limit to the number of cylinders that may be combined in a single operating unit beyond which the efficiency and reliability thereof is impaired. In order to obtain the high power required for the propulsion of large ships use has therefore been made of two or more independent oil engine units. Heretofore, these units drove separate propeller shafts or separate generators which in turn delivered power to one or more propeller shafts. The power plant of the present invention, however, includes two or more complete internal combustion engine units geared to a single driven shaft.

One object of the invention is to so mechanically connect the plurality of units that they operate in a definite timed relation, thus not only increasing the total power output but also providing a smoothness of power output, characteristic of and made possible by the total number of cylinders thus employed.

Another object is the provision of a reversing mechanism common to the plurality of units so as to insure that the units are all in forward or all in reverse running condition.

Another object is the provision of a flexible starting gear whereby the entire engine may be started by applying a starting agent to any or all of the units.

Another object is the provision of an individual control mechanism for each of the component units.

Another object is the provision of an automatic speed governor mechanism controlled by the driven shaft for limiting the speed of the units.

Other objects and advantages will hereinafter appear.

One embodiment of the invention is illustrated in the accompanying drawings, in which:

Figure 2 is a fragmentary side elevation of the engine.

Figure 3 is an end elevation, partly in section, of the upper portion of one of the engine units and illustrating a control mechanism therefor.

Figure 4 is a sectional view of rotary piston employed in the control mechanism.

Figure 5 is a sectional view of a starting air valve.

Figure 6 is a detail view illustrating the mounting of a valve actuating tappet arm.

Figure 7 is a plan view of the mechanism illustrated in Figure 3.

Figure 8 is a sectional view illustrating one end of a crank shaft of one of the units and the method of coupling the shaft to a pinion driven thereby.

Figure 9 is a section through the coupling taken substantially on the line 9—9 of Figure 8.

Figure 10 is a section, on a larger scale, taken substantially on the line 10—10 of Figure 9.

As above pointed out, the power plant of the present invention includes a set of two or more internal combustion engine units mechanically connected to a common shaft so that the several units operate in a definite timed relation and together form a complete engine. There may be any number of units. Each is preferably, however, a complete, well balanced engine in itself, so that any one or more of the units may be disconnected from the shaft without materially affecting the balance of the remaining portion of the engine as a whole.

Figure 1:
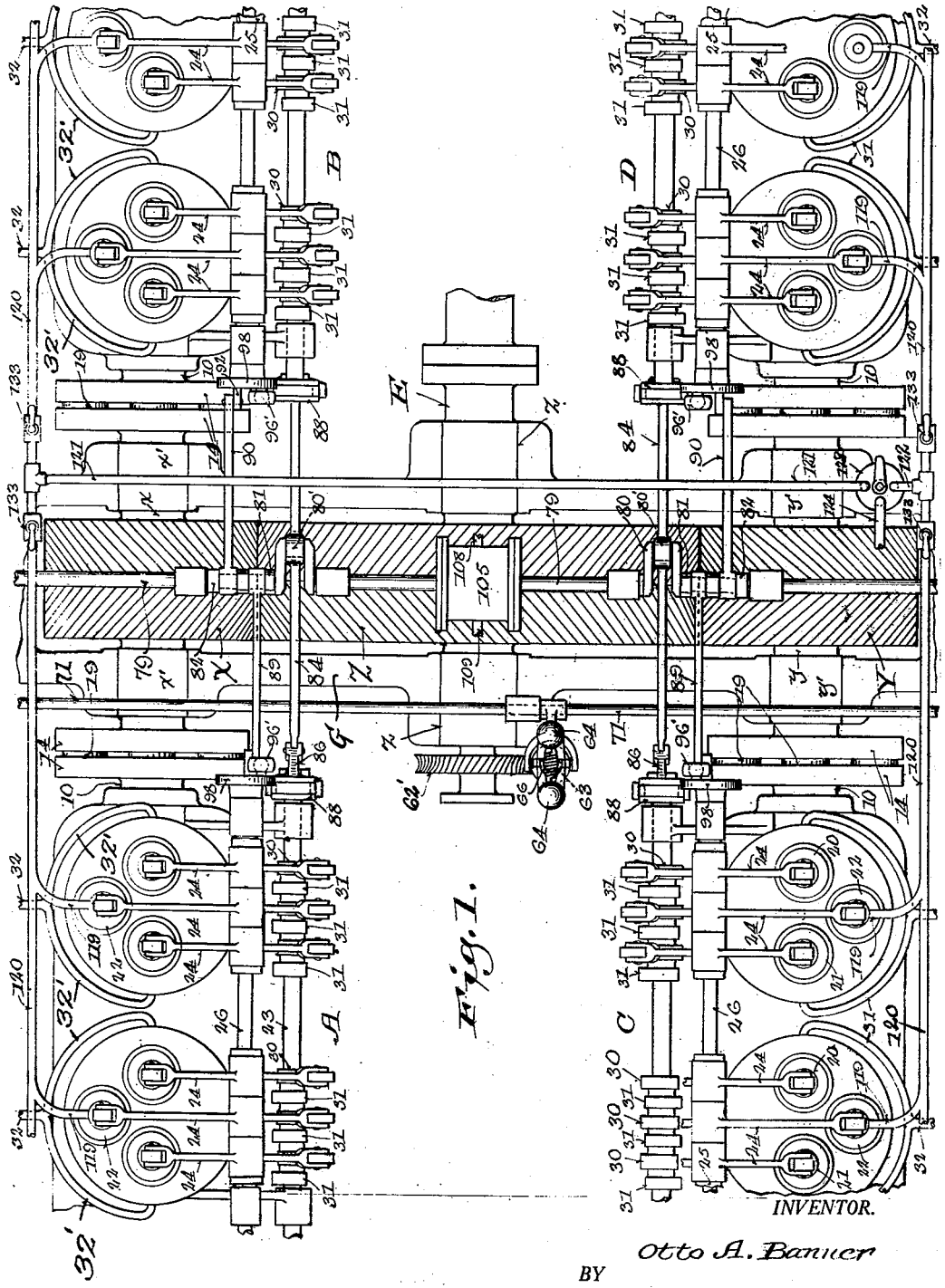
Figure 1 is a fragmentary plan view of a multiple unit internal combustion engine constructed in accordance with the present invention.

The power plant exemplified in the accompanying drawings includes four distinct operating units, A, B, C and D, preferably arranged in pairs on opposite sides of a main driven shaft E. As shown in Figure 1, the crank shafts 10 of the units A and B of one pair are coupled with a pinion X so that the two crank shafts must rotate in unison and thus produce in effect a single engine having cylinders equal in number to the total number of cylinders contained in the two sectional units. By positioning the pinion X between the crank shafts, each shaft transmits the power from the individual unit only and thus may be of lighter weight and strength than would be required if the power from both units were transmitted by a single shaft. Similarly the crank shafts 10 of the units C and D of the other pair are coupled with a pinion Y.

Pinions X and Y mesh with a gear Z fixed on the main driven shaft E, through which power is transmitted from each of the units to the main shaft. The pinions and gears are so proportioned as to give the most advantageous gear ratio for the purposes intended. In the present instance, shaft E is a propeller shaft and the gear Z is shown larger than pinions X and Y in order to obtain the desired speed reduction between the units and shaft. The gearing is preferably of the herring-bone type. The shaft E carrying the gear Z is preferably fixed against endwise play in bearings $z$, while the pinion shafts $x$ and $y$ are preferably so journaled in their bearings $x'$ and $y'$, respectively, as to permit slight end play, and thus permit the pinions X and Y to adjust themselves to the gear Z. Thus there is established a positive smooth running gear connection between the units on the opposite sides of the main shaft by which these units are caused to operate in unison in a definite timed relation. The gear set may be enclosed in a gear casing such as indicated at G.

The type or specific construction of each of the several units is quite immaterial to the present invention. In the embodiment illustrated, however, each is composed of several cylinders, four or six being preferred, and each is a four cycle, auto-ignition oil engine. Since the several units are substantially identical one with another, a brief description of one will suffice for all.

Each unit is provided with the usual crank shaft 10, having the usual cranks thereon, set in accordance with the best prevailing practice to reduce engine vibration to a minimum. A flange or collar 12 (Fig. 8) on the crank shaft seated in a saddle 13 in the bearing thereof prevents endwise play of the shaft. As above pointed out, a coupling is provided for connecting the crank shaft to the pinion shaft. This coupling may assume various forms, but it is preferably flexible and of such construction as to permit a slight end play of the pinion shaft for the purpose above mentioned. This is accomplished by the use of a coupling such as shown in detail in Figures 8, 9 and 10. This coupling includes two separate rings 14 mounted side by side and fixed to the adjacent ends of the crank shaft 10 and pinion shaft $y$, respectively. Each ring is provided with a plurality of spokes 15 having openings 16 therethrough forming seats for clutch elements 17. Each clutch element 17 is formed with a cylindrical body portion fitted within the opening and with a pair of spaced prongs 18 extending substantially between the corresponding prongs 18 of the adjacent clutch element on the other clutch ring. A band 19 of any suitable material, such as leather, encompassing the intermeshed prongs of adjacent clutch elements prevents relative rotation between the clutch rings. By this construction, the bands 19 transmit the power from the crank shaft 10 to the pinion shaft $y$ and yet permit a slight endwise movement of the pinion shaft with respect to the crank shaft.

Each unit is preferably reversible and is equipped with a valve gear of any standard or approved construction. In the present instance, each of the several cylinders is provided with an air intake valve 20, an exhaust valve 21, and a starting air valve 22. The valves are actuated from a cam shaft 23 by individual tappet arms 24 supported for independent rocking movement upon an eccentric 25 keyed or otherwise fixed to a rock shaft 26. Rock shaft 26 is rotatably supported in bearings 27, conveniently mounted on supporting brackets 28 secured to the engine body. The cam shaft 23 is slidably journaled in suitable bearings 29 preferably secured to the brackets 28.

The cam shaft 23 is provided with a set of forward cams 30 and a set of reverse cams 31 for selective cooperation with the tappet arms 24. By shifting the cam shaft longitudinally in one direction or the other, either set of cams may be brought into operative relation with the tappet arms of each cylinder. To permit the free shifting of the cam shaft the tappet arms should be lifted out of the range of the cams. This is taken care of in the usual way by the eccentric mounting of the tappet arms on the rock shaft. With the rock shaft 26 and the eccentric 25 in the full line position of Figure 6, the tappet arms are lowered to normal working position. By a slight rotation of the rock shaft in a counter clockwise direction (Fig. 6), the eccentric is moved to the dotted line position and the tappet arms are raised free from the cam shaft. The mechanism for rotating the rock shaft and for shifting the cam shaft for effecting a reversal of the engine will be later explained.

In the present instance, the fuel oil is delivered to the opposite sides of each of the several cylinders through branch pipes 32′ communicating with a pipe 32 through which the oil is forced at or near the end of the compression stroke by means of a pump 33 of any standard or approved construction. One pump is provided for each cylinder and all the pumps of one unit are actuated in proper timed relation from a cam shaft 34. Each pump includes an oil receiving chamber 35 in communication with a main supply pipe 36, a pressure chamber 37, and an exhaust chamber 38 in communication with the pipe 32. A ram 39 acts upon the body of oil in the pressure chamber 37. This ram is connected with a piston or crosshead 40 mounted for reciprocation in suitable guides and is actuated from the cam shaft 34 by means of a plunger 40' connected with the crosshead. A compression spring 41 holds the plunger against the cam.

A one way valve 42 interposed between the chambers 37 and 38 is yieldably held in closed position against its seat by a compression spring 43. This spring is of such strength as to permit the valve to open at a predetermined pressure of the oil in the pressure chamber 37, and thus permit the oil to pass into and through the exhaust chamber 38 and through pipes 32 and 32' into the engine cylinder. A valve 44 controls communication between the receiving chamber 35 and the pressure chamber 37. This valve is influenced toward closed position on its seat 45 by a compression spring 46, but is permitted to open during the suction stroke of the ram 39 to permit the oil to flow from chamber 35 into chamber 37. This valve is also held open for a portion of the pressure stroke of the ram 39 to permit some oil to flow back from chamber 37 to chamber 35 and thus avoid setting up sufficient pressure therein during such period as to open the valve 42. As soon as the valve 44 closes during the pressure stroke, sufficient pressure is instantly set up in chamber 37 to open valve 42 and force the oil in a sudden charge into the cylinder.

Various mechanisms may be provided for holding the valve 44 open during a portion of the pressure stroke. In the present instance, however, this mechanism includes a thrust pin 47 mounted adjacent the stem 48 of valve 44. This pin is yieldably held free from the valve stem by a spring 49 but may be forced against the stem to lift the valve from its seat by mechanism such as will now be described. A lever 50 rockably supported intermediate its ends between a pair of uprights 51 is provided at one end with an adjustable screw 52 for engagement with the upper end of pin 47. The other end of lever 50 is connected by a link 53 with one end of a lever 54. Lever 54 is mounted for rocking movement upon an eccentric 55 keyed or otherwise fixed to a control shaft 56. The other end of lever 54 engages a recess in the cross head 40 so as to reciprocate therewith.

The connections are such that, when the crosshead 40 is at the lower limit of its stroke, lever 50 is in such position that the screw thereon has forced the pin 47 downwardly to hold the valve 44 in open position. During the upward stroke of the crosshead lever 54 rocks in a counter clockwise direction (Fig. 3) about the eccentric 55, thus causing lever 50 to rock in a similar direction until a point is reached where the pin 47 disengages the valve stem 48 and permits the valve 44 to close. The point at which this occurs may be determined by the position of the eccentric 55. By rocking the control shaft 56 in a counter clockwise direction, the eccentric 55 is lowered, with the result that the valve 44 closes during an early stage of the pressure stroke of the ram 39 and a relatively large quantity of oil is forced into the engine cylinder. Similarly, by rocking the control shaft 56 in the opposite direction, the eccentric is raised, the valve is closed during a later stage of the pressure stroke and less oil is forced into the cylinder. A separate control shaft is preferably provided for each unit by which the supply of fuel to all the cylinders thereof may be controlled at will. Any appropriate means, such as a crank 57 and link 58, may be provided for effecting a manual adjustment of each control shaft.

In order to vary the time of operation of the several pumps in accordance with the forward or reverse condition of running of the engine, the cam shaft 34 is preferably provided with a forward set of cams 59 and a reverse set of cams 60 and is preferably slidably journaled in fixed bearings 61. By shifting the cam shaft 34 in one direction the forward set of cams 59 may be positioned beneath the cam rollers 62 on the plungers 40' and by shifting the cam shaft in the other direction the reverse set of cams 60 may be brought into operative relation therewith. Inclined surfaces, such as indicated at 59', and 60', may be provided for lifting the cam rollers onto the cams during the shifting of the cam shaft. The mechanism for shifting this cam shaft will be later explained.

In addition to the manual control for the individual units provision is preferably made for controlling the supply of fuel oil to all of the units simultaneously. In the present instance, mechanism for this purpose is placed under the control of the main driven shaft E, so that should the driven shaft exceed a certain predetermined speed the supply of fuel to the cylinders of the several units will be reduced. Thus racing of the engine is effectively prevented.

This mechanism is illustrated in Figures 1, 2, 3 and 7 of the drawings. A speed governor of any standard or approved type is geared to the main shaft E through a worm gear 62' fixed to the shaft and meshing with a worm (not shown) fixed to the vertical shaft 63 of the speed governor (Figs. 2 and 7). The governor includes a pair of centrifugal balls 64 mounted upon the upright arms of a pair of bell crank levers 65 and connected by the usual tension spring 66. The bell crank levers are pivotally mounted upon a supporting plate 67 carried by the governor shaft 63 and their horizontal arms are connected by means of links 68 to a collar 69, movable longitudinally of the shaft. A forked lever 70 fixed to a rock shaft 71 is provided with a pair of studs for engagement in a groove formed in the periphery of the collar 69. Thus it will be seen that when the balls 64 separate under the centrifugal force created by the rotation of shaft 63, the collar 69 is raised and the lever 70 and rock shaft 71 are rocked in a clockwise direction (Fig. 2).

As shown in Figure 1, rock shaft 71 extends across the entire engine. A lever arm 72, fixed to one end of the rock shaft, is connected by means of a link 73 with a lever arm 74 fixed to a second rock shaft 75. Shaft 75 extends lengthwise of the units C and D of one pair and is provided with a plurality of lever arms, one for each fuel pump, such as that shown at 76 in Figures 3 and 7. Each lever arm 76 is provided perferably with a bifurcated end 77, straddling the thrust pin 47, above referred to, and engageable with a flange or collar 78 thereon. The adjustment of the parts is such that when the main shaft E exceeds a certain predetermined speed, the governor acts through the lever 70, rock shaft 71, lever arm 72, link 73, lever arm 74 and rock shaft 75, to depress all of the lever arms 76 and consequently force the thrust pins 47 of all the fuel pumps of these two units against the corresponding valve stems 48 to lift the valves 44 from their seats and thus reduce the supply of fuel oil to the cylinders. In a similar manner, the rock shaft 71 is made to control the supply of fuel to the units A and B of the other pair.

Due to the positive mechanical connection between the several units, it is essential, or at least highly desirable, that the reversing of the entire engine be effected by mechanism that will insure the simultaneous reversal of all of the units. Figures 1, 2, 3, 4 and 7 show one form of mechanism that may be employed for this purpose. This mechanism includes a main reversing shaft 79 extending across the entire engine from one pair of units to the other and provided at or near each end with a plurality of cranks 80, 81, 82 and 83. Each of the cranks 80 is mechanically connected with the cam shafts 23 of an adjacent pair of units and is designed to shift these cam shafts to and from forward and reverse positions by rotation of the reversing shaft 79 through an angle of substantially 180°. This connection includes a bar 84 having a slot 85 intermediate its ends for receiving the crank pin 80'. Each unit is provided with a lever 86 mounted upon a horizontal pivot 87 and pivotally connected at its lower end with one end of the bar 84. The other end of each lever 86 is forked and is provided with a pair of pins 87' engaging a peripheral groove in a collar 88 fixed to the cam shaft 23.

Each of the cranks 81 and 82 is mechanically connected with the rock shaft 26 of one of the units to effect the rocking of the rock shaft so as to raise and lower the valve tappet arms 24 free of each cam shaft during the shifting thereof. For this purpose, these cranks are connected by links 89 and 90, with lever arms 91 and 92 fixed to stub shafts 93 and 94. Each stub shaft is provided with a lever arm 95 or 96 respectively connected by means of links 95' and 96' with discs 97 and 98 respectively fixed to the end of a rock shaft 26 of each unit.

Each of the cranks 83 is mechanically connected with the cam shafts 34 of an adjacent pair of units by means of a bar 99 having a slot 100 engaging the crank pin 83'. Each end of the bar 99 is provided with a yoke portion 101 engaging a peripheral groove 102 in a collar 103 fixed to the end of the cam shaft 34 of each unit.

In the position shown in the drawings, the parts are in position for forward running. By rotating the shaft 79 in a counter clockwise direction (Fig. 2) through the first 90° cranks 81 and 82 move the corresponding lever arms 91 and 92 to the left and right, respectively, thus raising both of the lever arms 95 and 96 and causing the rotation of each rock shaft 34 in such manner as to raise the valve tappet arms 24 free of the cam shafts 23. By further rotating the shaft 79 through a second 90° the lever arms 91 and 92 are returned to their original positions and the rock shafts 26 are so rotated as to return the tappet arms 24 into operative relation with their cam shafts 23. During this 180° rotation of the shaft 79 the cam shafts 23 are shifted to the right by the crank pin 80', bar 84 and levers 86. At the same time the crank pin 83' acts upon the bar 99 to shift the cam shafts 34 to the right. Thus it will be seen that a complete and simultaneous reversal of all of the units is effected by rotation of the shaft 79 through substantially 180°.

Any appropriate means, such as a rotary piston 104 shown particularly in Figures 3 and 4 of the drawings, may be employed to effect the desired rotation of shaft 79. The piston 104 therein shown is segmental in form and is secured to the shaft 79. It is mounted for rotation in a cylinder 105 supported by a suitable bracket 106 and provided with a segmental abutment 107. Oil under pressure is admitted to either side of the abutment 107 by means of pipes 108 and 109. By admitting oil under pressure through pipe 108, the piston may be rotated in one direction and by admitting oil under pressure through pipe 109 rotation in the other direction may be effected.

The starting or restarting of the engine after reversal may be accomplished in various ways. Since, in the present instance, all of the units are interconnected, the entire engine may be started by applying a starting agent to any or all of the units. By the starting mechanism that will now be described, provision is made for supplying compressed air to the starting air valves 22 of the cylinders of any or all of the units. As shown in Figure 5, each starting air valve includes a bushing 110 screwed or otherwise fixed in the cylinder wall and provided at its lower end with a valve seat 111 cooperating with a valve 112 normally held in closed position by a spring 113. A tubular portion 114 is screwed or otherwise fixed in the upper end of bushing 110 and is provided with a second valve 115 cooperating with a seat 116 in the lower end thereof. The valve is yieldably pressed toward closed position by a spring 117 and is moved toward open position by the action of one of the tappet arms 24, hereinabove referred to, upon the valve stem 118. A pipe 119 is in communication with the tubular portion 114 at all times.

Valve 112 remains closed irrespective of the position of the valve 115 until air under pressure is admitted to the tubular portion 114 through pipe 119. When compressed air is thus admitted and the valve 115 is open, under the influence of tappet arm 24, the air passes into bushing 110, forces valve 112 off its seat and enters the cylinder to act upon the piston therein.

Figure 11:
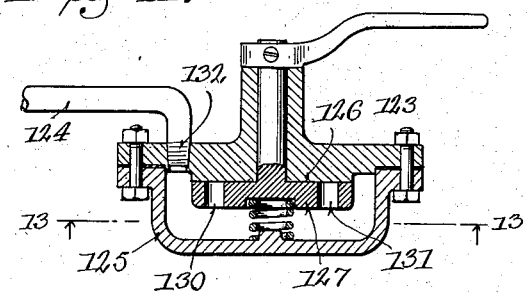
Figures 11, 12 and 13 are sectional views of a valve for admitting compressed air to the engine for starting purposes.
Figure 12:
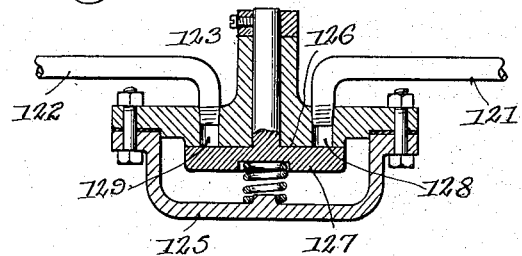
Figure 13:
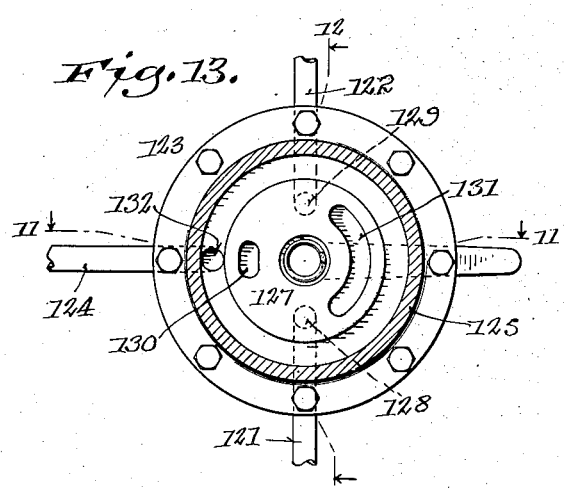

Compressed air may be admitted to the pipes 119 of each unit through pipes 120 connected therewith. Pipes 120 of the units A and B are connected with a branch supply pipe 121 and the pipes 120 of the units C and D are connected with a branch supply pipe 122. A single manually operated valve 123 is preferably employed for controlling the supply of compressed air to pipes 121 and 122 from a main supply conduit 124. Valve 123 is preferably of such construction as to admit air to either of pipes 121 and 122 or to both pipes simultaneously. As shown in Figures 11 and 12, this valve includes a valve casing 125 having a valve seat 126 for cooperation with a rotary valve disc 127. Two diametrically arranged ports 128 and 129 extend through the valve seat and communicate with pipes 121 and 122, respectively. The valve disc is provided with two arcuate slots 130 and 131 one somewhat longer than the other. The arrangement is such that by rotating the disc slightly in either direction, the longer slot 131 may uncover either of the ports 128 or 129, and upon further rotation the slot 130 may be made to uncover the other port. The main supply conduit 124 is in constant communication with the interior of the casing 125 through a port 132. Thus it will be seen that when either or both of the ports 128 and 129 are uncovered compressed air from the conduit 124 may pass from the casing to either or both of the pipes 121 and 122.

In starting the engine, oil under pressure is admitted to the cylinder 105 through either of the pipes 108 or 109, to rotate the piston 104, and hence the control shaft 79, and thus adjust the cam shafts of the several units into position for forward or reverse running, as the case may be. The valve 123 is then rotated in either direction to supply air under pressure to the starting air valves 22 of either or both pair of units to effect the starting of these units in the usual manner. Of course, the starting of any unit will effect the starting of the whole engine. As soon as sufficient compression has been established in the engine cylinders to ignite the fuel charge and the engine begins operating under its own power, the valve 123 is then rotated back to neutral position and the supply of compressed air cut off.

From the foregoing, it will be seen that a power plant is provided in which the several operating units are so mechanically connected as to produce in effect a single engine. As above pointed out, however, each unit is complete in itself, in that it has its individual crank shaft and cam shafts driven thereby. Should trouble develop in any of the units, that unit may therefore be readily disconnected from the rest of the engine merely by disconnecting the coupling between its crank shaft and the pinion shaft.

In order that any of the units may be cut off from the source of compressed air used in starting a cut off valve 133 may be provided in each of the pipes 120.

Various changes may be made in the embodiment of the invention above described without departing from or sacrificing any of the advantages of the invention as defined in the following claims.

I claim:

1. In a power plant, the combination of a driven shaft, a plurality of internal combustion engines comprising separate complete units connected in driving relation therewith, valves for each unit, forward and reverse cams for each unit, separately driven means for actuating the cams of each unit, and means for simultaneously placing all of the valves of said several units under the control of said forward cams or said reverse cams.

2. In a power plant, the combination of a driven shaft, a plurality of internal combustion engines comprising separate complete units connected in driving relation therewith, separately operated fuel injection mechanism for each unit and means controlled by said shaft operable on said fuel injection mechanisms for simultaneously varying the supply of fuel to said units.

3. In a power plant, the combination of a driven shaft, a plurality of internal combustion engines comprising separate complete units connected in driving relation therewith, a speed governor driven from said shaft and fuel injection mechanism for each unit controlled by said governor for limiting the operation of said units to a predetermined speed.

4. In a power plant, the combination of a pair of internal combustion engines comprising separate complete units having independent crank shafts and independent cam shafts, a gear, connections between each of said crank shafts and said gear to transmit the power from said crank shafts thereto, and means associated with said cam shafts for effecting the simultaneous reversal of said units.

5. In a multiple engine power plant the combination of a driven shaft, a plurality of separate complete oil engines each having a cam shaft and a crank shaft, gearing between said driven shaft and said crank shafts normally maintaining said engines in a definite phase relation, a reversing mechanism associated with the cam shaft of each engine, and means connected with said reversing mechanisms for effecting the simultaneous operation thereof to thereby effect the simultaneous reversal of said engines and thereby avoid imposing destructive strains on said gearing.

6. In a multiple engine power plant the combination of a driven shaft, a plurality of separate internal combustion engines, driving connections between said engines and shaft, a fuel injection mechanism for each engine, separate means for modifying the action of each injection mechanism to regulate the supply of fuel to each engine to thereby determine the load on each of the driving connections, and a unitary means connected with said injection mechanisms to simultaneously modify the action thereof to thereby effect a substantially uniform variation in the supply of fuel to said engines.

In witness whereof, I hereunto subscribe my name this 3rd day of August, 1920.

OTTO A. BANNER.